Patented Nov. 11, 1952

2,617,832

UNITED STATES PATENT OFFICE 2,617,832

METHOD FOR PREPARING DIPHENYLOL METHANE

Robert W. Martin, Lenox, Mass., assignor to General Electric Company, a corporation of New York No Drawing. Application June 28, 1951, Serial No. 234,151

3 Claims. (Cl. 260—619)

This invention is concerned with a method for preparing diphenylol methane having the formula

More particularly, the invention relates to a process for making diphenylol methane which comprises effecting reaction in the presence of a strong acidic type catalyst between a methylol urea (e. g., dimethylol urea, monomethylol urea, etc.) and an excess of phenol wherein the phenol is present in an amount equal to at least 2.5, e. g., from 2.6 to 6 or more mols of the latter, per mol of methylol group in the methylol urea.

German Patent 511,210 issued November 11, 1930, shows the reaction of dimethylol urea and phenol in the form of an aqueous alcohol solution and containing introduced gaseous hydrogen chloride. The patent discloses that under such conditions there is obtained about a 50% yield of alpha - (hydroxymethyl) beta - (2 - hydroxybenzyl) urea having the formula

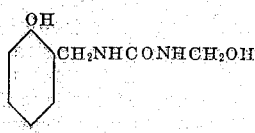

Unexpectedly, I have discovered that contrary to the teachings and disclosures in the above-mentioned German patent, under certain modified conditions instead of obtaining the urea derivative described above, I am able to obtain good yields of diphenylolmethane and as far as I have been able to determine I have not obtained the urea derivative which is found disclosed in the aforementioned German patent. In accordance with my invention in order to obtain the results described above for obtaining diphenylolmethane, I conduct the reaction between the methylol phenol and the urea in a solvent comprising an excess of the phenol using a strong acidic catalyst for the reaction, and employing water as a dispersing agent for the methylol urea. The methylol urea employed may comprise, for instance, dimethylol urea, monomethylol urea, etc.

The critical feature of my invention appears to lie in the fact that I employ an excess of phenol as compared to essentially equimolecular proportions of dimethylol urea and phenol disclosed in the above-mentioned patent. Thus, I may use from 2.5 to 6 or more, for example, 8 to 12 mols of phenol for each mol of methylol group present in the methylol urea.

The strong acidic type catalysts used may be any one of those well known in the art substantially nonreactive with any of the reactants, as, for example, hydrochloric acid, sulphuric acid, benzene sulfonic acid, toluene sulfonic acid; Friedel-Crafts type catalysts (e. g., BF₃, AlCl₃, ZnCl₂, etc.) etc. Although these strong acids per se may be employed, generally, I have found that aqueous mixtures of the acids as, for instance, concentrated hydrochloric acid (e. g., about 40% acid), concentrated sulfuric acid (e. g., 50% sulfuric acid, the remainder water) may preferably be employed in the practice of the invention.

The amount of acidic type catalyst used is not critical and may be varied within wide limits. Generally, on a weight basis I may use from 0.01 to 5% or more catalyst, e. g., hydrochloric acid, preferably in the form of a concentrated aqueous solution as, for instance, aqueous hydrochloric acid containing 40%, by weight, of HCl and having a specific gravity of about 1.2. Less concentrated acidic solutions may be employed but generally I prefer to use the concentrated form of the acidic type catalyst, e. g., hydrochloric acid or any other strong acid.

Generally, after mixing the phenol, the methylol urea, preferably in the form of a water suspension (e. g., from 1 to 6 parts or more, by weight, water per part of the methylol urea), and the strong acid catalyst, the mixture is preferably heated gently at a temperature of about 35° to 60° C. and thereafter heated to the boiling point of the mixture for a period ranging from about ½ to 3 hours to effect complete reaction. One other method for preparing the diphenylol methane comprises forming a mixture of the phenol and strong acid catalyst, heating the mixture to about 45° C. and while maintaining the temperature of the mixture at around this point, adding the methylol urea, for example, dimethylol urea, until solution is complete, and thereafter heating the entire mass at elevated temperatures (e. g., reflux temperatures of the mass) to complete the reaction.

In order that those skilled in the art may better understand how the present invention may be practiced, the following examples are given by way of illustration and not by way of limitation. All parts are by weight.

*Example 1*

In this example, 3000 grams phenol and 10 ml. concentrated hydrochloric acid (40% HCl of 1.2 specific gravity) were heated to 45° C. 300 grams of dimethylol urea was stirred with 600 grams of water to form a slurry, only part of the dimethylol urea dissolving in the water. The slurry of dimethylol urea was added slowly to the aforementioned heated phenol while the phenol was being stirred vigorously. The temperature of the reaction mixture was kept at around 45–60° C. during the addition of the dimethylol urea which required about 1 hour. The reaction mixture was stirred about ¾ hour after all of the dimethylol urea had been added during which time the temperature dropped to 40° C. The mixture was then heated to 60° C. for 30 minutes, and thereafter 200 ml. of concentrated hydrochloric acid was added and the mixture again heated at 100–102° C. for 1 hour.

The excess phenol and aqueous HCl were distilled off at elevated temperatures at 20–25 mm. pressure. The pot temperature was taken to 130° C. and the still head temperature was taken to 100° C. The residue left in the distilling flask was poured into two liters of boiling water and stirred vigorously. The aqueous layer was decanted and allowed to cool. The water extraction was again repeated. The residue was then extracted repeatedly with boiling toluene. The crystals which separated from the water extract and toluene extract totalled 898.5 grams. Recrystallation of this product from water gave about 479 grams of 4,4'-diphenylol methane melting at 154–157° C. This material was identified by infra red absorption spectra, and mixed melting point with an authentic sample of the diphenylol methane as being the latter material. A sample was distilled and was shown to have a boiling point of 237–43° C./12–13 mm. and a melting point of about 159.5–161.5° C. The literature reports a melting point of 162° C. for highly purified 4,4'-diphenylol methane. The yield of essentially pure diphenylol methane represented about 47.9% yield of product based on the amount of dimethylol urea originally employed.

This yield of purified product is many times that recorded by Megson and Drummond (J. Soc. Chem. Ind. 49, 251, 57T, 1930) who obtained 6.2 grams of diphenylol methane, that is 4,4'-dihydroxy diphenyl methane upon reacting 270 grams of phenol and an equal molar quantity of paraform in the form of an alcoholic solution. This yield of product is also apparently many times that obtained by the patentee in German Patent 511,210 who only speaks of obtaining traces of diphenylol methane. In the latter instance, these products are seldom obtained, only one case being mentioned, and then only in a small quantity.

*Example 2*

In this example, 30 grams of 2,4-dimethyl phenol was dissolved in 30 cc. of glacial acetic acid and 5 cc. concentrated hydrochloric acid. The solution was heated for 80–90° C. and a solution of 3 grams of dimethylol urea in 25 ml. of water was added in small portions. The mixture was then boiled for 50 minutes and upon cooling a solid separated. The aqueous layer was decanted and fresh water was added. The mixture was again heated to boiling and when the product was again cooled, copious amounts of crystals were formed. The crystalline mass was separated from the water by extraction with ether. The ether solution was dried and part of the ether evaporated. Upon adding petroleum ether, a snow white crystalline product separated. The product melted at 150–152° C. and was soluble in caustic solution. The sample was analyzed for carbon and hydrogen and found to contain 80.06% carbon and 7.86% hydrogen. The calculated values for a compound having the formula

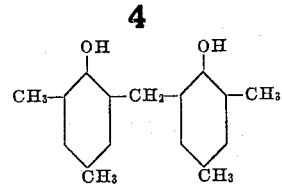

is 79.90% carbon and 7.83% hydrogen. Zinke and Ziegler, Ber. 74B, 205–14 (1941) have prepared a compound described immediately above and reported a melting point of 148° C.

It will, of course, be apparent to those skilled in the art that other concentrations of the phenol, that is, of either the phenol itself or the 2,4-dimethyl phenol, based on the urea, may be also employed without departing from the scope of the invention. In addition to dimethylol urea one may also use monomethylol urea. Instead of using concentrated hydrochloric acid, other acidic type catalysts, many examples of which are mentioned above, may be employed in the quantity described above or in larger or smaller amounts. The conditions under which reaction is effected between the ingredients may, of course, be varied within wide limits without departing from the scope of the invention. Reaction may take place from room temperature to as high as 125°–150° C.

Instead of extracting with water, it is possible, especially in the case when one of the reactants is 2,4-dimethyl phenol to use hot toluene as the extraction medium.

The diphenylol methane prepared in accordance with the present invention has many uses. Among these may be mentioned, for example, as an intermediate in the preparation of other compositions, specifically chlorinated derivatives thereof which have been found to have good insecticidal properties. In addition, the diphenylol methane may be caused to react with various aldehydic compounds, for example, formaldehyde, to make resins or resinous compositions which have use in the molding and laminating arts.

What I claim as new and desire to secure by Letters Patent of the United States is:

1. The process which comprises effecting reaction between a methylol urea selected from the class consisting of monomethylol urea and dimethylol urea with phenol in the presence of an acidic type catalyst, the phenol being present in a molar ratio of at least 2.5 mols of phenol per mol of methylol group in the methylol urea, and thereafter isolating the diphenylol methane obtained thereby.

2. The process which comprises effecting reaction between phenol and dimethylol urea in the presence of a strong acidic type catalyst, the phenol being present in a molar ratio of at least 2.5 mols of phenol per mol of methylol group in the dimethylol urea, and thereafter isolating the diphenylol methane obtained thereby.

3. The process which comprises effecting reaction between phenol and dimethylol urea in the presence of aqueous hydrochloric acid, the phenol being present in a molar ratio of at least 2.5 mols of phenol per mol of methylol group in the dimethylol urea, and thereafter isolating the diphenylol methane compound prepared thereby.

ROBERT W. MARTIN.

REFERENCES CITED

The following references are of record in the file of this patent:

FOREIGN PATENTS

| Number | Country | Date |
| --- | --- | --- |
| 511,210 | Germany | Oct. 16, 1930 |